US011919438B2

(12) United States Patent
Takori et al.

(10) Patent No.: US 11,919,438 B2
(45) Date of Patent: Mar. 5, 2024

(54) VEHICLE HEADLIGHT DEVICE

(71) Applicant: HONDA MOTOR CO., LTD., Tokyo (JP)

(72) Inventors: Masayoshi Takori, Saitama (JP); Yuji Tsuchiya, Saitama (JP)

(73) Assignee: HONDA MOTOR CO., LTD., Tokyo (JP)

(*) Notice: Subject to any disclaimer, the term of this patent is extended or adjusted under 35 U.S.C. 154(b) by 0 days.

(21) Appl. No.: 18/165,335

(22) Filed: Feb. 7, 2023

(65) Prior Publication Data
US 2023/0249610 A1 Aug. 10, 2023

(30) Foreign Application Priority Data

Feb. 8, 2022 (JP) ................................. 2022-018315

(51) Int. Cl.
B60Q 1/14 (2006.01)
B60Q 1/18 (2006.01)

(52) U.S. Cl.
CPC ............ *B60Q 1/1415* (2013.01); *B60Q 1/18* (2013.01); *B60Q 2300/12* (2013.01); *B60Q 2300/45* (2013.01)

(58) Field of Classification Search
USPC ......................................................... 362/459
See application file for complete search history.

(56) References Cited

U.S. PATENT DOCUMENTS 9,024,740 B2   5/2015  Min et al.
9,771,021 B1*  9/2017  Lindsay .................. B60Q 1/38
9,789,808 B1  10/2017  Hong et al.
(Continued)

FOREIGN PATENT DOCUMENTS

JP    2007246060 A    9/2007
JP    2009220631 A   10/2009
(Continued)

OTHER PUBLICATIONS

Office Action issued in the U.S. Appl. No. 18/165,336, dated Jun. 13, 2023.
(Continued)

*Primary Examiner* — Bryon T Gyllstrom
(74) *Attorney, Agent, or Firm* — CKC & Partners Co., LLC

(57) ABSTRACT

A vehicle headlight device capable of improving overlooking of pedestrians by a driver. The device includes: a left-side photoirradiator (left-side pattern irradiation lamp) which irradiates light on a left-side light distribution region (irradiation pattern light distribution region) on a left side of a travel roadway of a vehicle in an irradiation pattern in which a bright region a1 and a dark region are alternately repeated; and a right-side photoirradiator (right-side pattern irradiation lamp) which irradiates light on a right-side light distribution region (irradiation pattern light distribution region) on a right side of a travel roadway of the vehicle in an irradiation pattern in which a bright region a1 and a dark region are alternately repeated. In this embodiment, the left-side photoirradiator (left-side pattern irradiation lamp) is illuminated during left turn of the vehicle, and the right-side photoirradiator (right-side pattern irradiation lamp) is illuminated during right turn of the vehicle.

4 Claims, 12 Drawing Sheets

(56) References Cited

U.S. PATENT DOCUMENTS

| | | | |
|---|---|---|---|
| 10,126,411 B2 * | 11/2018 | Gilliland | G01S 7/4817 |
| 10,217,361 B2 | 2/2019 | Jung et al. | |
| 10,421,389 B2 | 9/2019 | Nagata et al. | |
| 10,843,622 B2 | 11/2020 | Lee et al. | |
| 10,981,497 B2 | 4/2021 | Lee et al. | |
| 2003/0138132 A1 * | 7/2003 | Stam | B60Q 1/085 |
| | | | 382/104 |
| 2007/0019396 A1 | 1/2007 | Kaiba | |
| 2009/0284751 A1 * | 11/2009 | Drake, Jr. | G01N 29/2418 |
| | | | 359/330 |
| 2013/0058116 A1 | 3/2013 | Galbas et al. | |
| 2013/0093583 A1 * | 4/2013 | Shapiro | B60Q 9/005 |
| | | | 348/148 |
| 2019/0171871 A1 * | 6/2019 | Zhang | G06V 40/103 |

FOREIGN PATENT DOCUMENTS

| | | | |
|---|---|---|---|
| JP | 2014010975 A | 1/2014 | |
| JP | 2016199111 A | 12/2016 | |

OTHER PUBLICATIONS

Notification of Reasons for Refusal issued in the JP Patent Application No. 2022-018319, dated Dec. 5, 2023.
Notification of Reasons for Refusal issued in the JP Patent Application No. 2022-018315, dated Nov. 7, 2023.

* cited by examiner

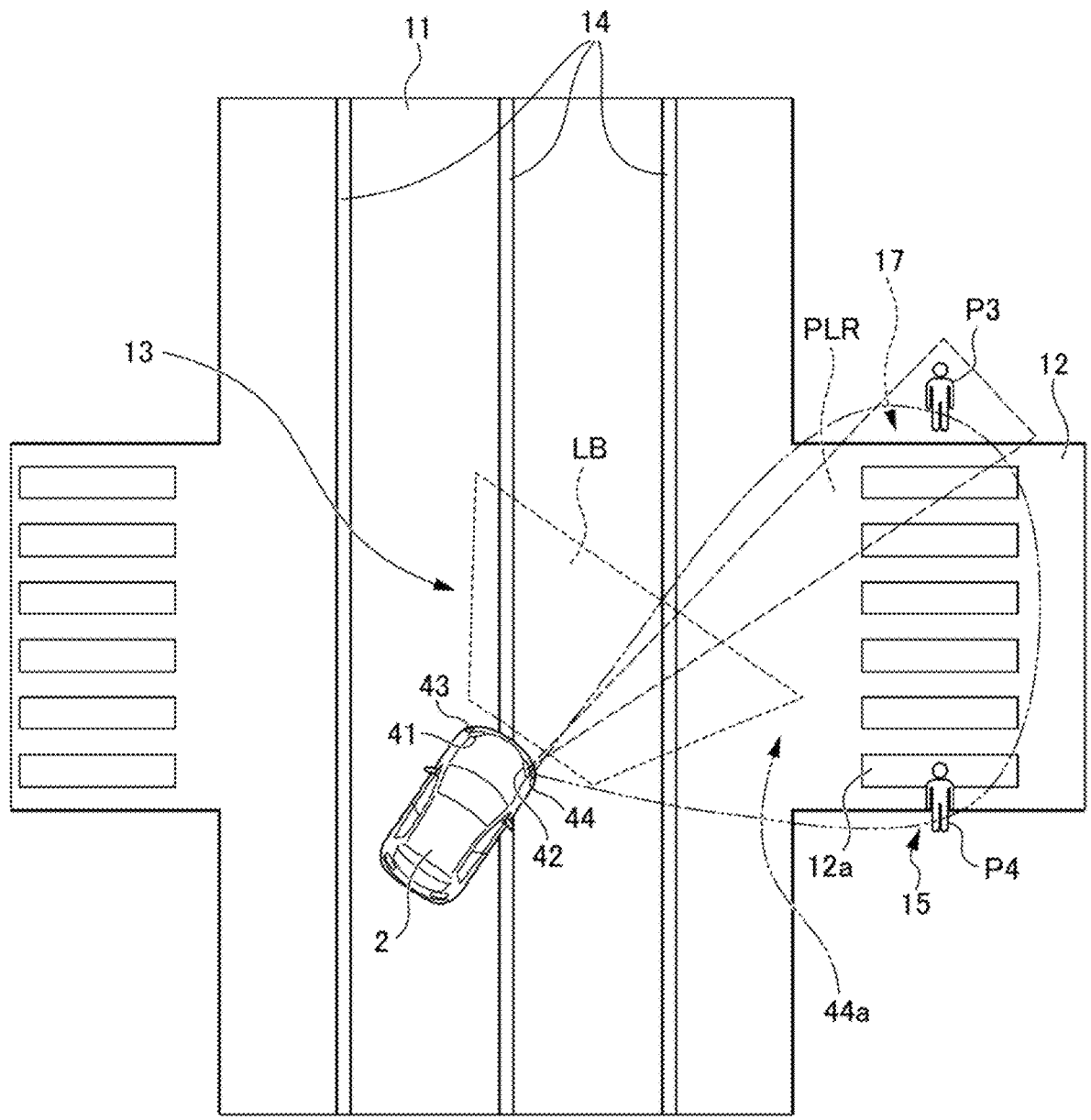

ed later) on a left side of a travel roadway of a vehicle
VEHICLE HEADLIGHT DEVICE This application is based on and claims the benefit of priority from Japanese Patent Application No. 2022-018315, filed on 8 Feb. 2022, the content of which is incorporated herein by reference.

BACKGROUND OF THE INVENTION

Field of the Invention

The present invention relates to a vehicle headlight device.

Related Art

A device has been proposed which adjusts and controls the optical axis direction of a vehicle headlight device based on steering angle and vehicle speed (for example, refer to Patent Document 1). With the vehicle headlight device of Patent Document 1, it is configured so as to divide the conditions related to a change angle calculation of the optical axis direction, in response to the degree of steering angle and vehicle speed.

Patent Document 1: Japanese Unexamined Patent Application, Publication No. 2007-246060

SUMMARY OF THE INVENTION

It is well known that there are many accidents at intersections, and this type of accident is not seldom caused by overlooking of pedestrians. It should be made so that such overlooking of pedestrians does not occur. The technology of Patent Document 1 changes the optical axis direction of the vehicle headlight device to improve visibility in the vicinity of a pedestrian crossing; however, it is not considered that adequate measures have been necessarily taken from the viewpoint of preventing overlooking of pedestrians under adverse conditions, particularly at nighttime and rain at night.

The present invention has been made taking account of the above such situation, and has an object of providing a vehicle headlight device which can improve overlooking of pedestrians by a driver, even under adverse conditions such as nighttime and rain at night.

A vehicle headlight device according to a first aspect of the present invention (for example, the vehicle headlight device 1 described later) includes: a left-side photoirradiator (for example, the left-side pattern irradiation lamp 41 serving as the left-side photoirradiator described later) which irradiates light on a left-side light distribution region (for example, the irradiation pattern light distribution region 16 described later) on a left side of a travel roadway of a vehicle (for example, the vehicle 2 described later) in an irradiation pattern (for example, the irradiation pattern Lp described later) in which a bright region (for example, the bright region a1 described later) and a dark region (for example, the dark region a2 described later) are alternately repeated; and a right-side photoirradiator (for example, the right-side pattern irradiation lamp 42 serving as the right-side photoirradiator described later) which irradiates light on a right-side light distribution region (for example, the irradiation pattern light distribution region 17 described later) on a right side of a travel roadway of the vehicle in an irradiation pattern in which a bright region and a dark region are alternately repeated.

According to a second aspect of the present invention, in the vehicle headlight device as described in the first aspect, the left-side photoirradiator is illuminated during left turn of the vehicle, and the right-side photoirradiator is illuminated during right turn of the vehicle.

With the vehicle headlight device of the first aspect, since the irradiation pattern light distribution region of a direction in which the vehicle is trying to change course is irradiated in the irradiation pattern in which the bright region and dark region are alternately repeated by the pattern photoirradiator, the presence of the pedestrian at a side is easily recognized from the driver according to the visual property of a person. Therefore, overlooking of pedestrians by the driver can be improved even under adverse conditions such as nighttime or rain at night.

Since the vehicle headlight device of the second aspect illuminates the left-side photoirradiator during left turn of the vehicle, and illuminates the right-side photoirradiator during right turn of the vehicle, it is possible for the driver to reliably recognize the presence of the pedestrian in the direction in which the vehicle tries to change course.

BRIEF DESCRIPTION OF THE DRAWINGS

FIG. 6A is a schematic diagram showing, in a plan view, irradiation light from the pattern irradiation lamp, etc. in FIG. 2 on a vehicle turning right at an intersection;

in FIG. 2 on a vehicle turning right at an intersection;

in FIG. 2 on a vehicle turning right at an intersection;

DETAILED DESCRIPTION OF THE INVENTION

Hereinafter, an embodiment of the present invention will be explained while referencing the drawings. It should be noted that, in the following explanation, irradiation pattern light distribution region is an irradiation area of a certain specified light, and irradiation pattern is an irradiation shape of light relative to the irradiation pattern light distribution region.

Figure 1:
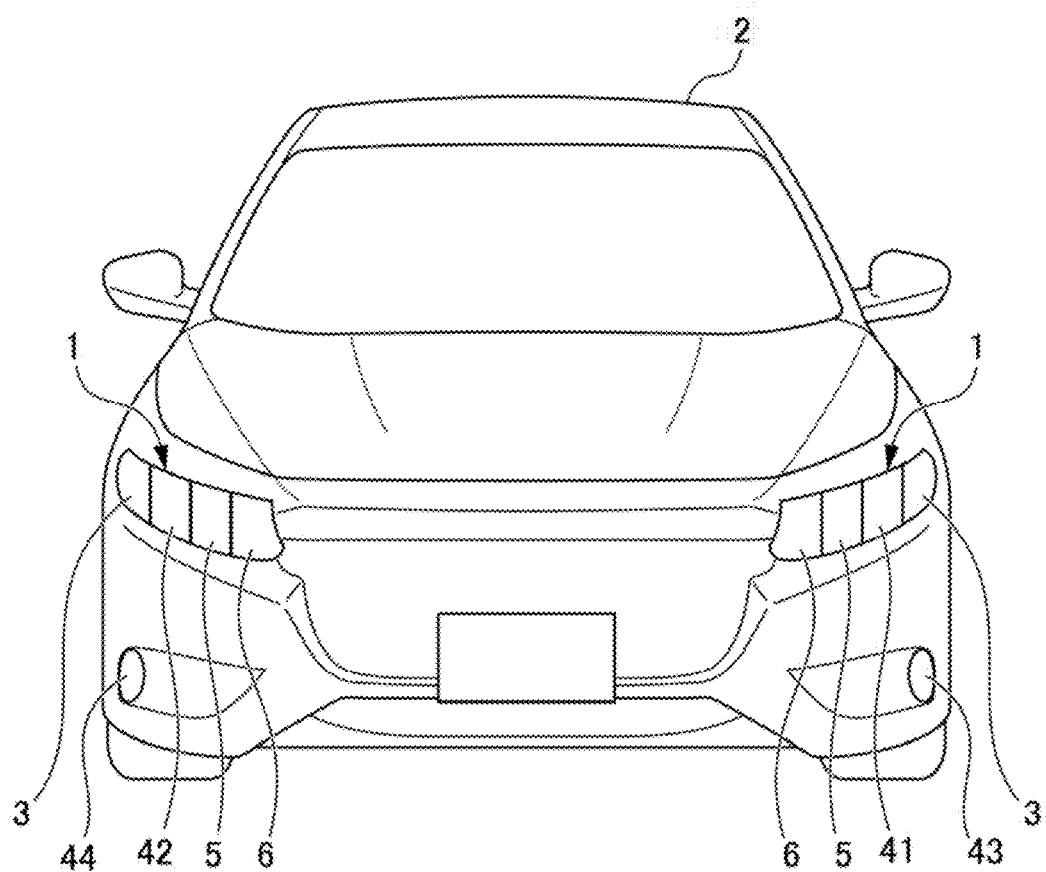
FIG. 1 is a schematic diagram showing a vehicle headlight device as an embodiment of the present invention.

FIG. 1 is a conceptual block diagram showing a vehicle headlight device of an embodiment of the present invention. The vehicle headlight devices 1 are included at each of a left side and right side in a left/right symmetrical form viewing from the central position in the vehicle width direction of a vehicle 2. In the vehicle headlight device 1, a turn signal lamp 3, pattern irradiation lamp 4, low beam lamp 5 and high beam lamp 6 are arranged in order from an outer side toward an inner side in the vehicle width direction.

It should be noted that the pattern irradiation lamp 4 is a generic term for the left-side pattern irradiation lamp 41 which is a left-side photoirradiator, and a right-side pattern irradiation lamp 42 which is a right-side photoirradiator. In addition, a left-side cornering light 43 is provided outwardly below the vehicle headlight device 1 on the left side, and a right-side cornering light 44 is provided outwardly below the vehicle headlight device 1 on the right side.

The turn signal lamp 3 is a normal lamp of this type. The pattern irradiation lamp 4 as a pattern photoirradiator irradiates light onto irradiation pattern light distribution regions 16, 17 of the vehicle 2 in irradiation patterns in which a bright region and dark region are alternately repeated. The low beam lamp 5 irradiates light in a predetermined light distribution area of a low beam. The high beam lamp 6 irradiates light in a predetermined light distribution area of a high beam. It should be noted that the vehicle 2 equipped with the vehicle headlight device 1 is called one's own vehicle 2 as appropriate hereinafter. In the above, the irradiation pattern light distribution region 16 is a light distribution region on the left side which is leftwards of the travel roadway of one's own vehicle 2. The irradiation pattern light distribution region 17 is a light distribution region on the right side which is rightwards of the travel roadway of one's own vehicle 2.

The left-side cornering light 43 illuminates when a condition determined as the driver having a left turn intention is satisfied, such as illumination of the low beam lamp 5, a left turn operation on the directional indicator lever (not shown), vehicle speed at moment of this operation, etc. The left-side cornering light 43 irradiates the light distribution region (not shown) based on the light distribution region 44a described later which is below the irradiation pattern light distribution region 16, in a form in which the entire area is a bright region. In other words, the left-side cornering light 43 irradiates the road surface of a region including the left side of the vehicle 2.

The right-side cornering light 44 illuminates when a condition determined as the driver having an intention of turning right is satisfied, such as illumination of the low beam lamp 5, a right turn operation on the directional indicator lever (not shown), and vehicle speed at the moment of this operation. The right-side cornering light 44 irradiates the light distribution region 44a described later below the irradiation pattern light distribution region 17 in a form in which the entire region is a bright region. In other words, the right-side cornering light 44 irradiates the road surface of a region including the right side of the vehicle 2. It should be noted that the vehicle 2 equipped with the vehicle headlight device 1 is called one's own vehicle 2 as appropriate hereinafter.

Figure 2:
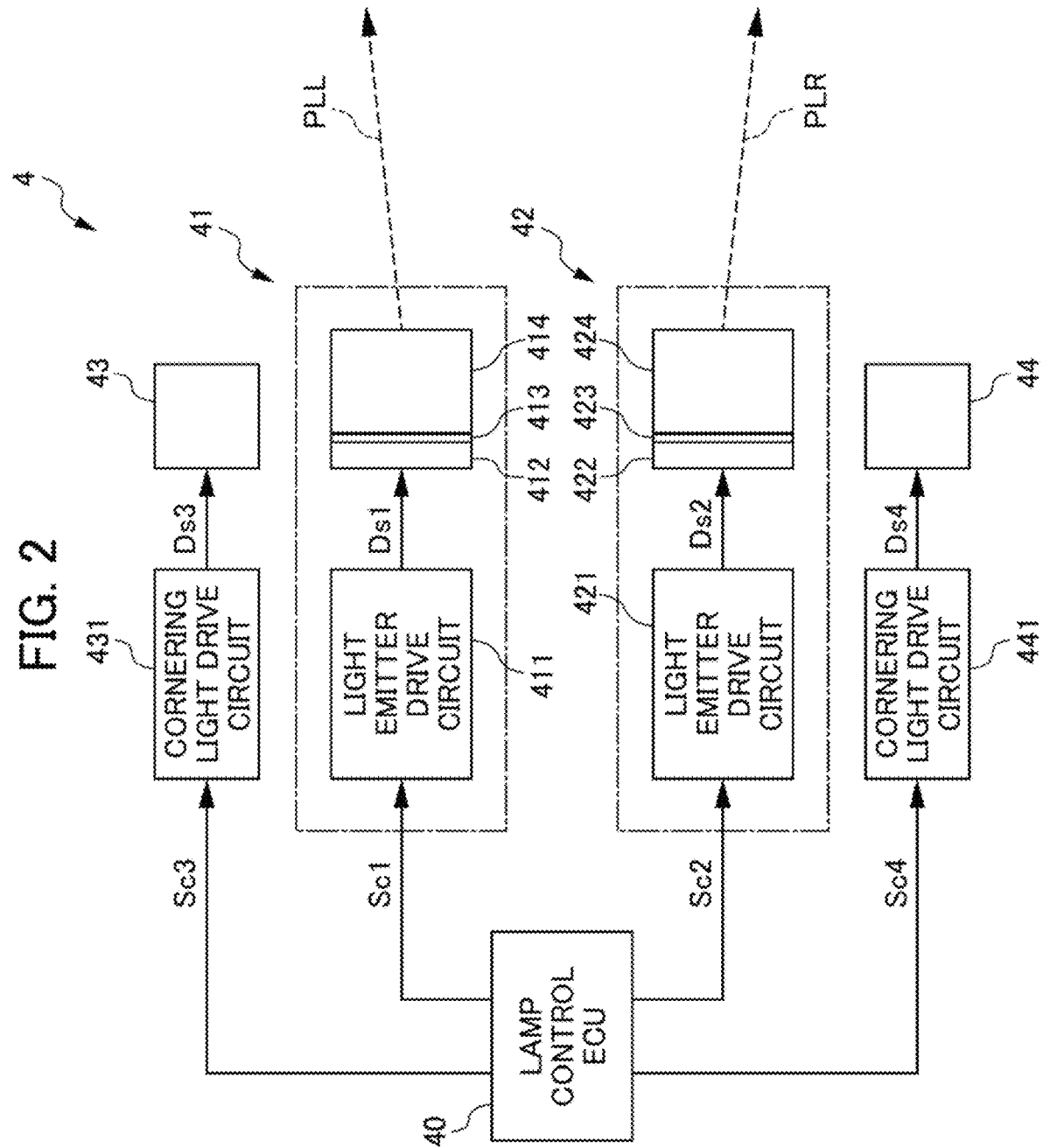
FIG. 2 is a conceptual block diagram showing a pattern irradiation lamp and left/right cornering lights in the vehicle headlight device of FIG. 1.

FIG. 2 is a conceptual block diagram showing the pattern irradiation lamp 4 and left/right cornering lights in the vehicle headlight device 1 of FIG. 1. The pattern irradiation lamp 4 has a left-side pattern irradiation lamp 41 which is a left-side photoirradiator, and a right-side pattern irradiation lamp 42 which is a right-side photoirradiator. The left-side pattern irradiation lamp 41 is configured to include a light emitter drive circuit 411, surface emitting element 412, shading mask 413 and projection optical system 414.

FIG. 2 is a conceptual block diagram showing the pattern irradiation lamp 4 and left/right cornering lights of the vehicle headlight device 1 of FIG. 1. The pattern irradiation lamp 4 has a left-side pattern irradiation lamp 41 which is a left-side photoirradiator, and a right-side pattern irradiation lamp 42 which is a right-side photoirradiator. The left-side pattern irradiation lamp 41 is configured to include a light emitter drive circuit 411, surface emitting element 412, shading mask 413 and projection optical system 414.

The right-side pattern irradiation lamp 42 is configured to include a light emitter drive circuit 421, surface emitting element 422, shading mask 423 and projection optical system 424. The shading mask 413 has a light transmission slit corresponding to the first irradiation pattern in which a bright region and dark region are alternately repeated. The shading mask 423 has a light transmission slit corresponding to the second irradiation pattern in which a bright region and dark region are alternately repeated. In one embodiment of the present invention, the first irradiation pattern and second irradiation pattern are the same irradiation pattern.

The light emitter drive circuit 411 of the left-side pattern irradiation lamp 41 generates the element drive signal Ds1 and supplies to the surface emitting element 412 in response to the startup command signal Sc1 supplied from the lamp control ECU 40 equipped to the vehicle 2. The surface emitting element 412 emits light in response to the element drive signal Ds1. By the emission of the surface emitting element 412, the left-side pattern irradiation lamp 41 irradiates the left-side irradiation light PLL of the first irradiation pattern towards the light distribution region 16 described later, through the shading mask 413 and projection optical system 414.

The light emitter drive circuit 421 of the right-side pattern irradiation lamp 42 generates the element drive signal Ds2 and supplies to the surface emitting element 422 in response to the startup command signal Sc2 supplied from the lamp control ECU 40. The surface emitting element 422 emits light in response to the element drive signal Ds2. By the emission of the surface emitting element 422, the right-side pattern irradiation lamp 42 irradiates the right-side irradiation light PLR of the second irradiation pattern towards the light distribution region 17 described later, through the shading mask 423 and projection optical system 424. It should be noted that the first irradiation pattern and second irradiation pattern are the same irradiation pattern in one embodiment of the present invention, as mentioned above.

Corresponding to the left-side cornering light 43, a cornering light drive circuit 431 driving this is provided. The cornering light drive circuit 431 generates an element drive signal Ds3 and supplies to the left-side cornering light 43 in response to the left-side corning light lighting command signal Sc3 supplied from the lamp control ECU 40. The left-side cornering light 43 irradiates the road surface on the left side of the vehicle 2 in response to the element drive signal Ds3.

Corresponding to the right-side cornering light 44, a cornering light drive circuit 441 driving this is provided. The cornering light drive signal 441 generates the element drive signal Ds4 and supplies to the right-side cornering light 44, in response to the right-side cornering light lighting command signal Sc4 supplied from the lamp control ECU 40. The right-side cornering light 44 irradiates the road surface on the right side of the vehicle 2 in response to the element drive signal Ds4.

Figure 3:
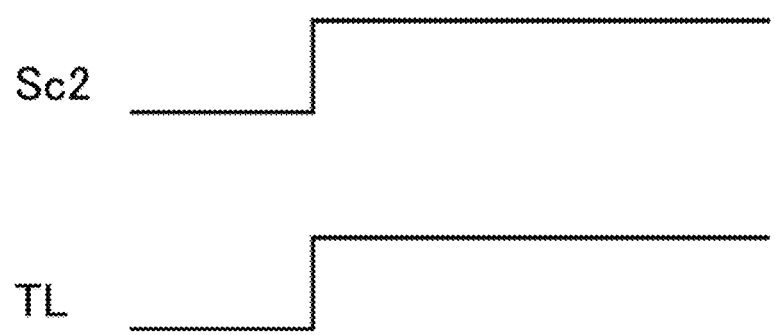
FIG. 3 is a timing chart showing operation of the pattern irradiation lamp in FIG. 2.

FIG. 3 is a timing chart showing operation of the right-side pattern irradiation lamp 42 of FIG. 2. In FIG. 3, the reference symbol TL is the lighting command signal. The lighting command signal TL is generated and supplied to the lamp control ECU 40 when a condition determined as the driver having an intention of right turning from a higher-order ECU of the lamp control ECU 40 in FIG. 2 is satisfied. The lighting command signal TL indicates a lighting instruction when the signal level is high, and a lights-out instruction when low.

The lamp control ECU 40 turns the startup command signal Sc2 to the lighting instruction level, in response to the lighting command signal TL turning to the lighting instruction. As a result, when the condition determined as the driver having an intention of right turn is satisfied, the right-side pattern irradiation lamp 42 irradiates the irradiation light.

Similarly to when explained by referencing FIG. 3, when a condition determined as the driver having an intention of left turn is satisfied, the left-side pattern irradiation lamp 41 irradiates the irradiation light.

Figure 4:
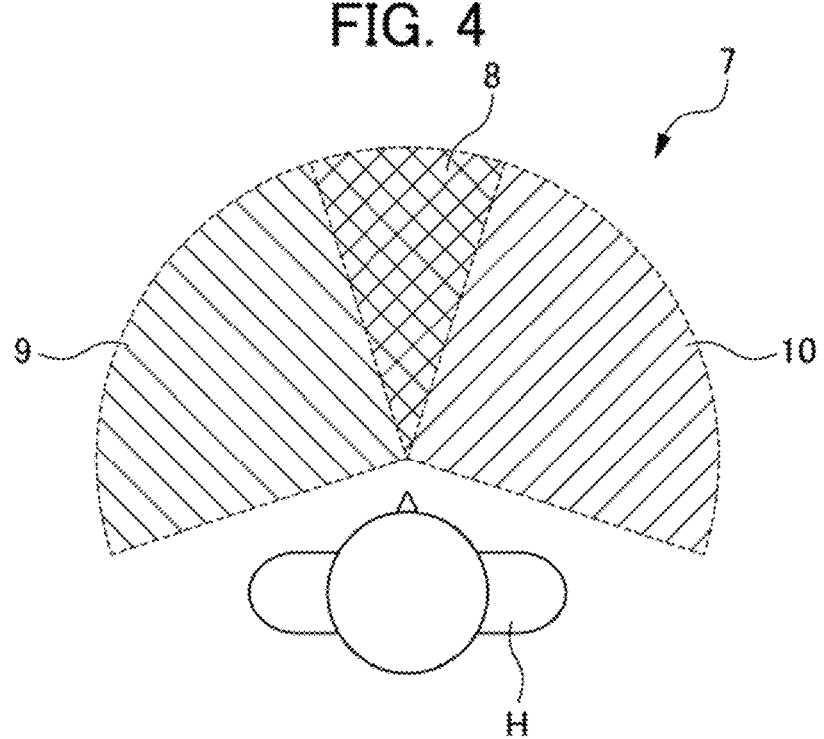
FIG. 4 is a view schematically showing a visual property of a person according to the technical concept of the present invention.

FIG. 4 is a view schematically showing a visual property of a person according to the technical concept of the vehicle headlight device 1 of the present invention described later. In FIG. 4, a forward field of view 7 of a person H is divided into a center field of view 8 which widens at a fixed acute angle to the left and right from a front face, and a left peripheral field of view 9 and right peripheral field of view 10 adjacent on the left and right of the center field of view 8, from the visual property of the person.

The general visual property of a person exhibits a tendency whereby shapes are clearly visible but reaction to movement is delayed, in the center field of view 8. The left peripheral field of view 9 and right peripheral field of view 10 exhibit a tendency whereby shapes are vague, but reaction to movement is fast, i.e. sensitivity to motion is high. The vehicle headlight device 1 of the present invention is based on the idea of actively using the aforementioned such visual property of a person.

Figure 5:
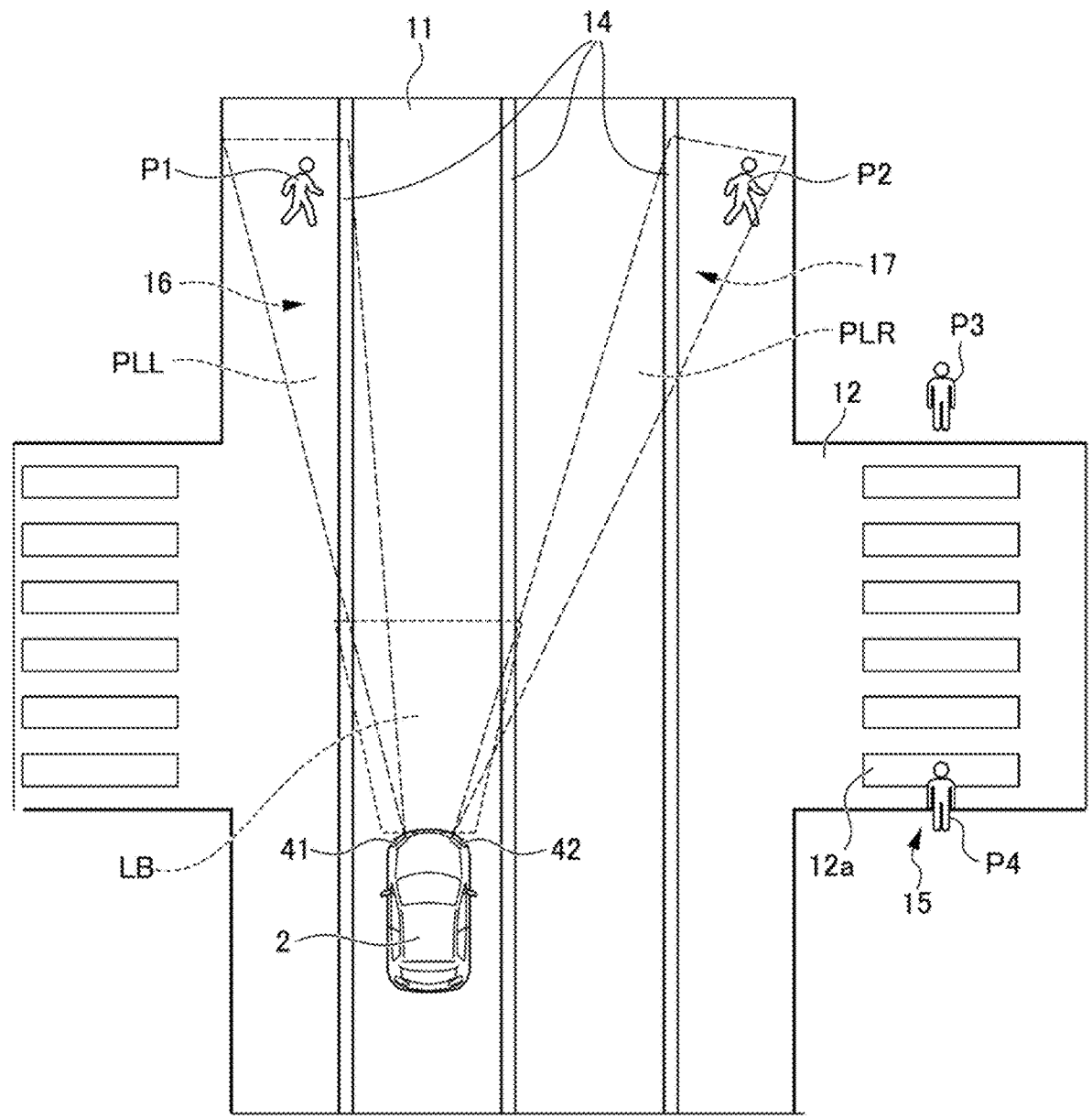
FIG. 5 is a schematic diagram showing, in a plan view, irradiation light from the pattern irradiation lamp of FIG. 2 on a vehicle traveling on a straight road.

FIG. 5 is a schematic diagram showing, in a plan view, the irradiation light from the pattern irradiation lamps 41, 42 in FIG. 2 of the vehicle 2 going straight on a straight road. FIG. 5 shows a case of the vehicle 2 trying to go straight on the road 11 on which positioned. The road 11 is a road having wide width on which the divider lines 14 including a road center line are drawn, whereby sidewalks are demarcated. It should be noted that the irradiation light from the low beam lamp 5 is indicated by the reference symbol LB.

During nighttime, the low beam lamp 5, left-side pattern irradiation lamp 41 and right-side pattern irradiation lamp 42 irradiate the irradiation light PLL and PLR according to manual operation by the driver or an auto-light function. The left-side pattern irradiation lamp 41 irradiates the irradiation pattern light distribution region 16 of the left-side irradiation light PLL. The right-side pattern irradiation lamp 42 irradiates the irradiation pattern light distribution region 17 of the right-side irradiation light PLR.

Figure 6B:
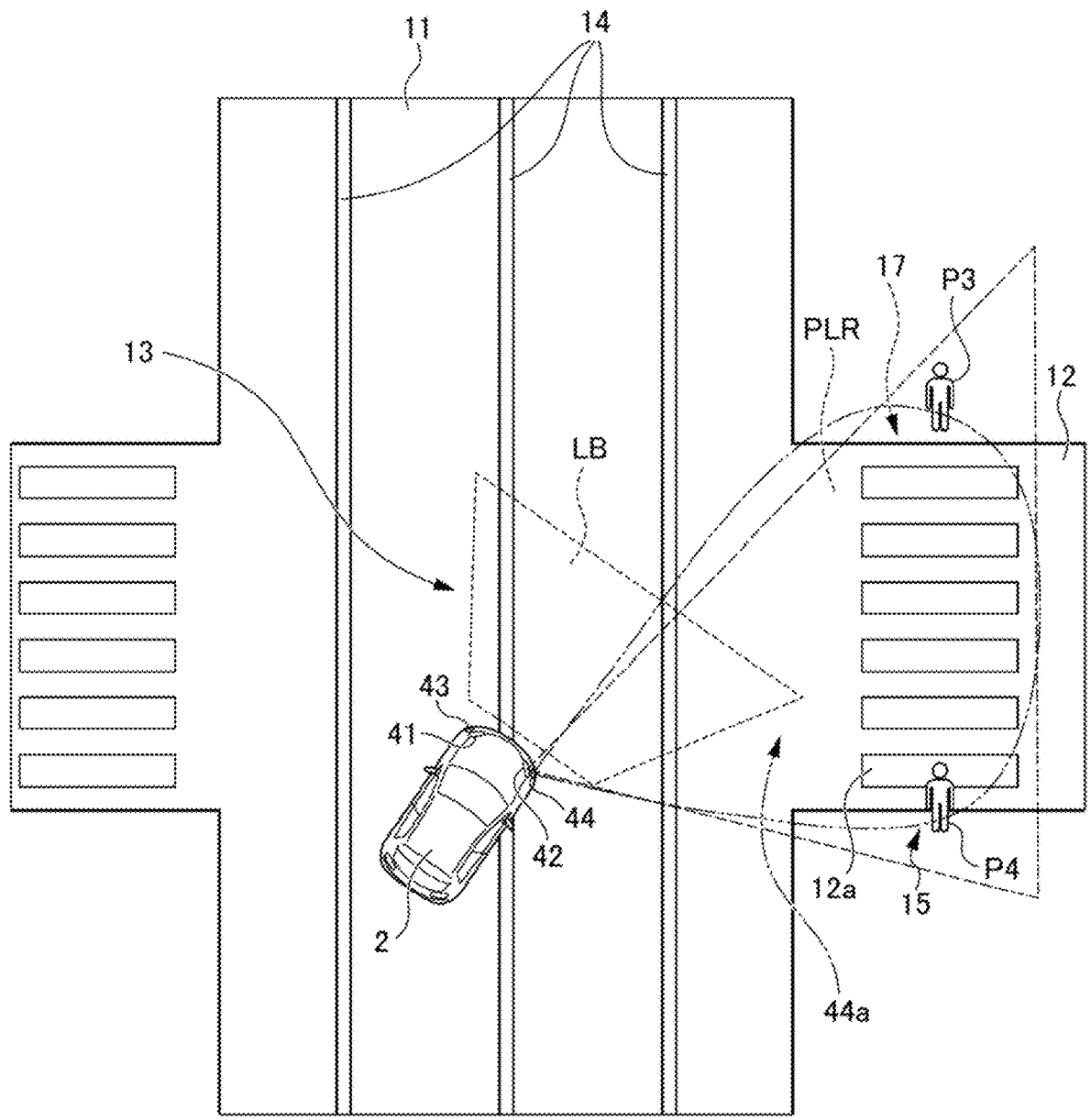
FIG. 6B is a schematic diagram showing, in a plan view, another state of irradiation light from the pattern irradiation lamp, etc.
Figure 6C:
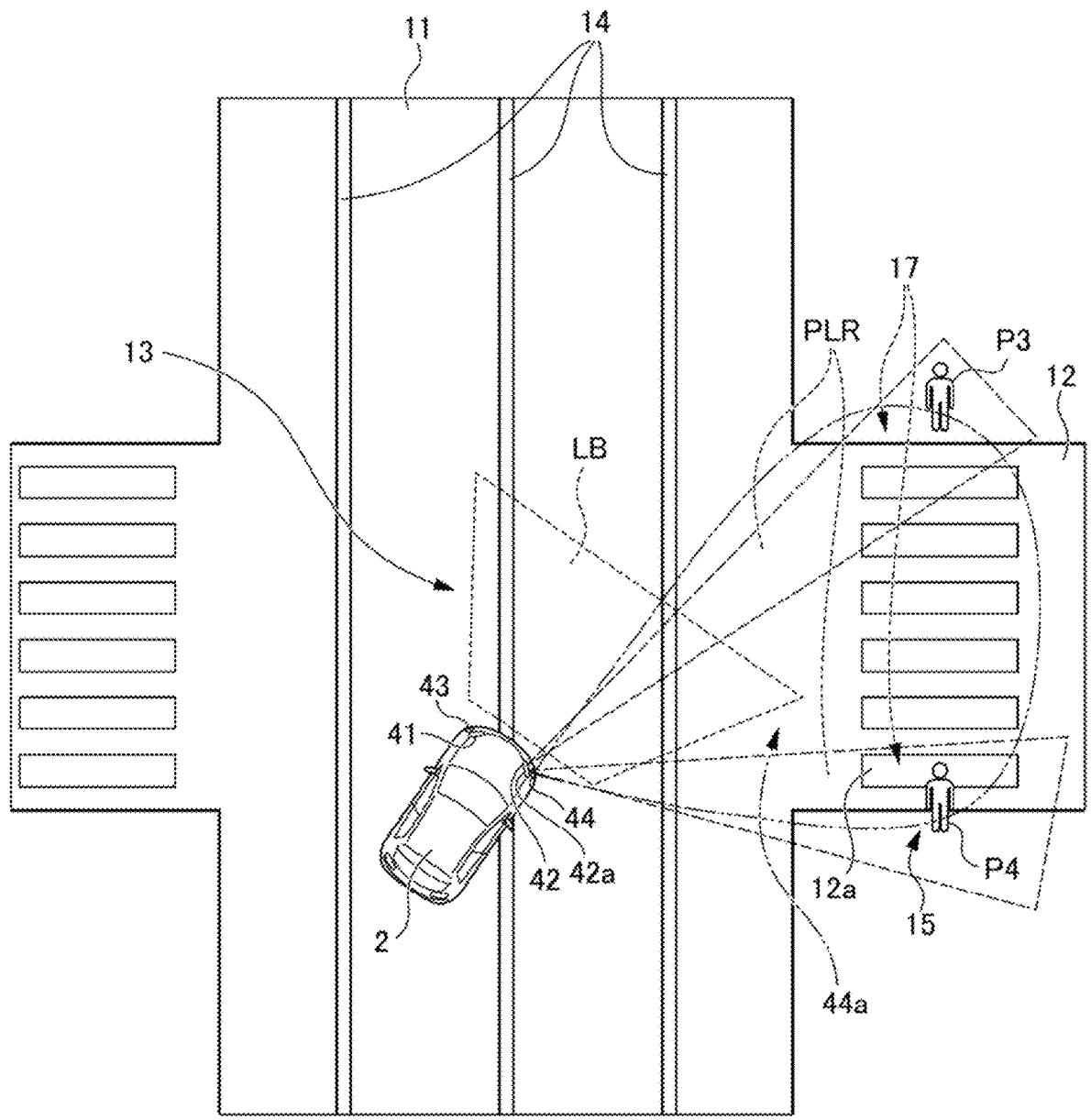
FIG. 6C is a schematic diagram showing, in a plan view, another state of irradiation light from the pattern irradiation lamp, etc.

It should be noted that the left-side cornering light 43 irradiates the road surface of the light distribution region 43a including the left side of the vehicle 2, and the right-side cornering light 44 irradiates the road surface of the light distribution region 44a including the right side of the vehicle 2. In the case of the vehicle 2 going straight on a straight road as in FIG. 5, the left-side corning light 43 and right-side cornering light 44 are unlit. The light distribution region 43a of the left-side corning light 43 is symmetrical with the light distribution region 44a of the right-side cornering light 44, relative to the center line in the front/rear direction of the vehicle 2 in a plan view from FIG. 6A to FIG. 6C.

FIG. 6A is a schematic diagram showing, in a plan view, the irradiation light from the pattern irradiation lamp of FIG. 2 of the vehicle turning right at the intersection. FIG. 6A shows a case of the vehicle 2 trying to make a right turn at an intersection 13 between a road 11 on which the vehicle 2 is located, and a road 12 intersecting the road 11. The road 11 is a road of wide width in which the divider lines 14 including the road center line are drawn, whereby sidewalks are demarcated, and the road 12 is a narrower in width. The pedestrian crossing 12a in the vicinity of the intersection 13 of the road 12 is indicated by traffic marking. It should be noted that the irradiation light from the low beam lamp 5 is indicated by the reference symbol LB.

In the vehicle 2, when a condition determined as the driver having an intention of a right turn is satisfied, such as operation of right turn on the directional indicator lever, vehicle speed at the moment of this operation, etc., the left-side pattern irradiation lamp 41 is unlit, and the right-side pattern irradiation lamp 42 irradiates irradiation light. The right-side pattern irradiation lamp 42 irradiates the road surface of the light distribution region 17 including the right side of the vehicle 2. The right-side pattern irradiation lamp 42 irradiates the light distribution region 17 in the irradiation pattern of the right-side irradiation light PLR.

It should be noted that, in the case of there being an oncoming vehicle during right turn when the vehicle is passing on the left side, within the time waiting for passing of the oncoming vehicle approaching, control is performed to turn off the right-side pattern irradiation lamp 42, to suppress the risk of the driver of the oncoming vehicle being dazed by the irradiation light from the right-side pattern irradiation lamp 42. In addition, also for during a left turn in the case of the vehicle passing on the right side, the left-side pattern irradiation lamp 41 irradiates the irradiation light, and the right-side pattern irradiation lamp 42 is unlit. It should be noted that, in the following embodiment, for during left turn, since left/right becomes the opposite control during right turn, explanation thereof is omitted.

In addition to the irradiation light LB from the low beam lamp 5, by irradiating the irradiation light from the right-side pattern irradiation lamp 42, it was verified that the visibility to a pedestrian 15 on the right side of the vehicle during right turn improves remarkably. More specifically, when defining the positions of the pedestrians 15 in FIGS. 5 and 6A as P1, P2, P3 and P4, and explaining by referencing each of these positions as pedestrians, the verification results are as follows.

Visibility to pedestrian P1 on the left sidewalk of the road 11, the pedestrian P2 on the right sidewalk on the opposite side of the oncoming lane, and pedestrian P3 trying to cross relatively from the back side to the near side, in a direction viewing the pedestrian crosswalk 12a of the road 12 from the vehicle 2 improved remarkably from a "hardly seen" level to "well seen" level, compared to a case of irradiating only the irradiation light LB from the low beam lamp 5. It should be noted that, in the case of irradiating the left-side irradiation light PLL from the left-side pattern irradiation lamp 41 in the irradiation pattern light distribution region 16 on the left sidewalk of the road 11, visibility noticeably improved for the pedestrian P1.

However, in the direction viewing the pedestrian crossing 12a of the road 12 from the vehicle 2, visibility to the pedestrian P4 trying to cross relatively from the near side to the back side is the "hardly seen" level, unchanged from the case of irradiating only the irradiation light LB from the low beam lamp 5. Therefore, by establishing as the irradiation pattern light distribution region 17 such as that shown in FIGS. 6B and 6C, the visibility to the pedestrian P4 also remarkably improves to the "well seen" level. More specifically, in FIG. 6B, by oscillating the above-mentioned right-side pattern irradiation lamp 42 in the left/right direction, or widening the width of the irradiation range of the right-side pattern irradiation lamp 42, it is possible to obtain the irradiation pattern light distribution region 17. In addition, in FIG. 6C, by providing a second right-side pattern irradiation lamp 42a which further irradiates the right side in addition to the right-side pattern irradiation lamp 42 of FIG. 6A, the irradiation pattern light distribution region 17 is obtained.

Next, by irradiating light on the irradiation pattern light distribution regions 16, 17 of the vehicle 2 in the irradiation pattern in which a bright region and dark region are alternately repeated, a phenomenon when visually confirming the pedestrian 15 from the driver will be explained by referencing FIGS. 7 to 10. It should be noted that, although the phenomenon is explained in FIGS. 7 to 10 in the case of irradiating light in the irradiation pattern in which the bright region and dark region are alternately repeated from the left-side pattern irradiation lamp 41, which is the left-side photoirradiator, this also applies to the phenomenon in the case of irradiating light by the right-side pattern irradiation lamp 42, which is the right-side photoirradiator.

Figure 7:
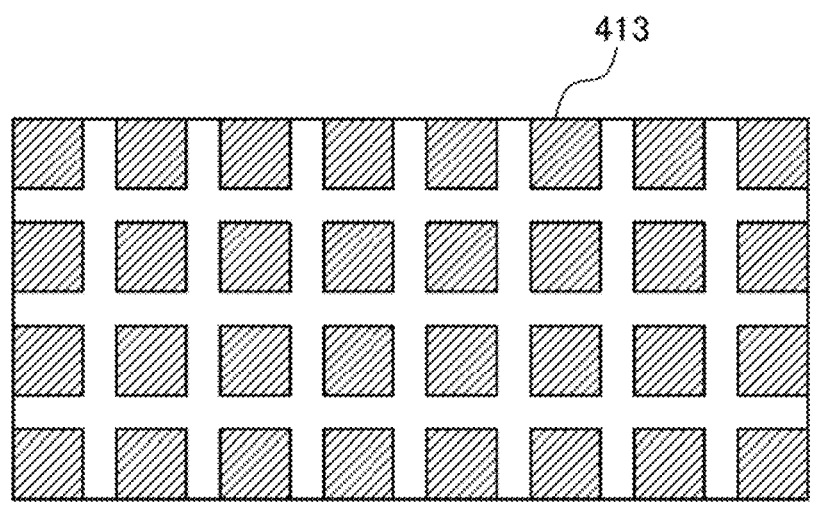
FIG. 7 is a view schematically showing a shading mask applied to the pattern irradiation lamp of FIG. 2.
Figure 8:
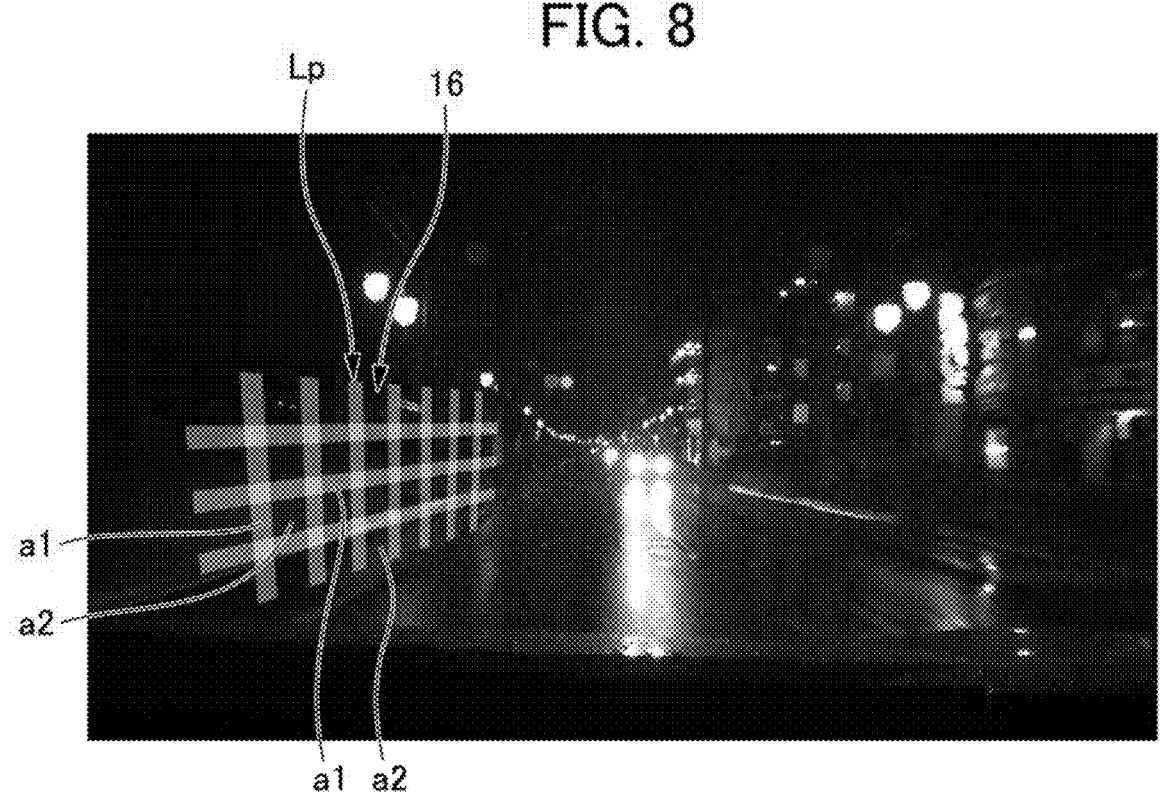
FIG. 8 is a schematic diagram showing an aspect viewing the irradiation light of the irradiation pattern of FIGS. 5, 6A, 6B and 6C in the driving field of view at night.

FIG. 7 is a view schematically showing a shading mask 413 applied to the left-side pattern irradiation lamp 41 of FIG. 2. FIG. 8 is a schematic diagram showing an aspect of viewing the left-side irradiation light PLL of the irradiation pattern Lp from the shading mask 413 of FIG. 7 in the driving field of view at night. The irradiation pattern Lp of the left-side irradiation light PLL of the irradiation pattern by the shading mask 413 is irradiated on the left-side irradiation pattern light distribution region 16 ahead of the vehicle 2, and is brightly visible in a grid pattern. In other words, the grid-like irradiation pattern Lp in which the bright region a1 and dark region a2 are alternately repeated can be seen.

Figure 9:
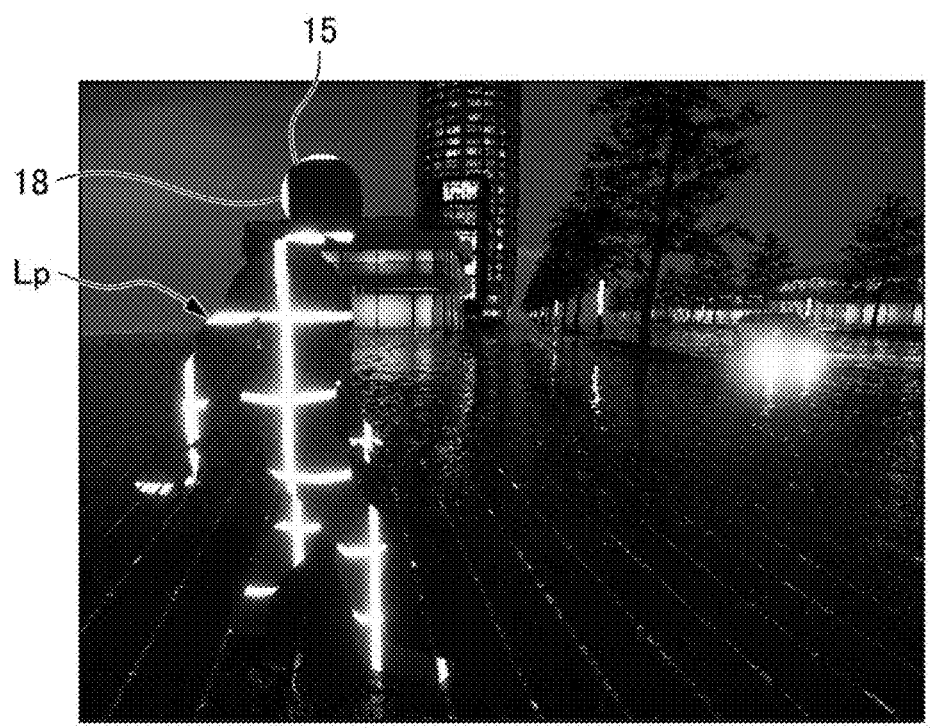
FIG. 9 is a view showing, from the viewpoint of the driver, an aspect of a pedestrian standing still being irradiated by the irradiation light from the pattern irradiation lamp of FIG. 2.
Figure 10:
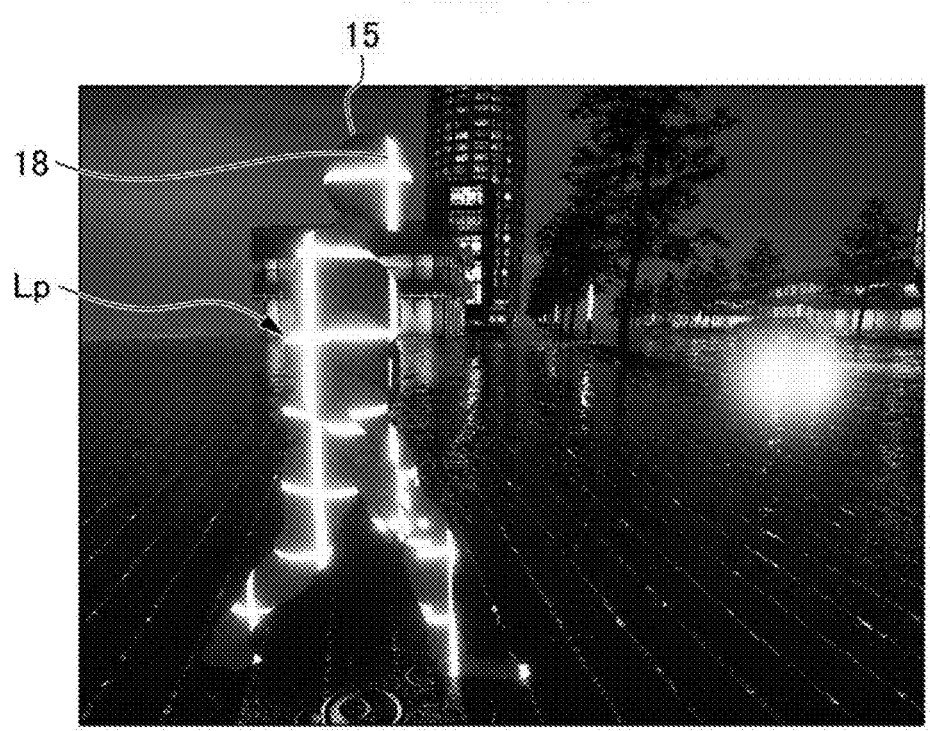
FIG. 10 is a view showing, from the viewpoint of the driver, an aspect of a pedestrian during movement being irradiated by irradiation light from the pattern irradiation lamp of FIG. 2.

FIG. 9 is a view showing, in the viewpoint of the driver, an aspect of the pedestrian 15 standing still being irradiated by light of the irradiation pattern Lp from the left-side pattern irradiation lamp 41 of the vehicle headlight device 1. FIG. 10 is a view showing, in a viewpoint of the driver, an aspect of the pedestrian 15 during movement being irradiated by light of the irradiation pattern Lp from the left-side pattern irradiation lamp 41 of the vehicle headlight device 1.

When the pedestrian 15 moves from the roadside, as understood by referencing FIGS. 9 and 10, the shape of the bright part 18 of the grid-like pattern irradiated by light of the irradiation pattern Lp on the pedestrian 15 changes. The bright part 18 has great contrast from the adjacent parts, and is clearly visible from the driver.

In practice, the shape of the bright part 18 can be seen as changing and moving due to the visual property of people. The change in shape of the bright part 18 occurs in the peripheral field of view of the driver. It is thereby possible for the driver to immediately recognize the presence of the pedestrian 15. For this reason, overlooking of pedestrians by the driver can be remarkably improved.

The configurations of the left-side pattern irradiation lamp 41 and right-side pattern irradiation lamp 42 of the vehicle headlight device 1 according to the embodiment of the present invention are not limited to the embodiments of FIGS. 2 and 7. For example, the left-side pattern irradiation lamp 41 and right-side pattern irradiation lamp 42 may be configured by projectors adopting a DMD (Digital Mirror Device) including a micro mirror group irradiating light in an irradiation pattern Lp on the irradiation pattern light distribution regions 16, 17. In addition, although configured so as to irradiate the irradiation light from the left/right pattern irradiation lamps 41, 42 during straight travel, and turn off the left pattern irradiation lamp during right turn, it may be configured so as to irradiate the irradiation light from the right pattern irradiation lamp only during right turn.

According to the vehicle headlight device 1 of the present embodiment, the following effects are exerted.

(1) The vehicle headlight device 1 includes: the left-side pattern irradiation lamp 41 which irradiates light on the left-side irradiation pattern light distribution region 16 on the left side of the travel roadway of the vehicle 2 in the irradiation pattern Lp in which the bright region a1 and dark region a2 are alternately repeated; and the right-side pattern irradiation lamp 42 which irradiates light on the irradiation pattern light distribution region 17 on the right side of the travel roadway of the vehicle 2 in the irradiation pattern in which the bright region and dark region are alternately repeated. Since the irradiation pattern light distribution region 17 of a direction in which the vehicle 2 is trying to turn right is irradiated in the irradiation pattern Lp in which the bright region a1 and dark region a2 are alternately repeated by the right-side pattern irradiation lamp 42, the presence of the pedestrian 15 at a side is easily recognized from the driver according to the visual property of a person. Therefore, overlooking of pedestrians by the driver can be improved even under adverse conditions such as nighttime or rain at night. Also in the case of the vehicle 2 trying to turn left, the left-side pattern irradiation lamp 41 and left-side cornering light 43 function similarly, and can improve overlooking of pedestrians by the driver, similarly to the case of the vehicle 2 trying to turn right.

(2) The vehicle headlight device 1 illuminates the left-side pattern irradiation lamp 41 during left turn of the vehicle 2, and illuminates the right-side pattern irradiation lamp 42 during right turn of the vehicle 2; therefore, it is possible for the driver to reliably recognize the presence of the pedestrian 15 in the direction in which the vehicle 2 tries to turn right. Also in the case of the vehicle 2 tries to turn left, since the left-side pattern irradiation lamp 41 is illuminated, it is possible to improve overlooking of the pedestrian by the driver, similarly to the case of the vehicle 2 trying to turn right.

An embodiment of the present invention has been explained above. The present invention configures the left-side photoirradiator to irradiate light on the left-side light distribution region in the irradiation pattern in which the bright region and dark region are alternately repeated, and the right-side photoirradiator to irradiate light on the right-side light distribution region in the irradiation pattern in which the bright region and dark region are alternately repeated; however, this is a technical concept that encompasses cases in which the irradiation pattern from the left-side photoirradiator and the irradiation pattern from the right-side photoirradiator differ.

EXPLANATION OF REFERENCE NUMERALS a1 bright region
a2 dark region
H person

Lp irradiation pattern
1 vehicle headlight device
2 vehicle
3 turn signal lamp
4 pattern irradiation lamp
5 low beam lamp
6 high beam lamp
7 forward field of view
8 central field of view
9 left peripheral field of view
10 right peripheral field of view
11 road
12 road
13 intersection
14 divider line
15 pedestrian
16 irradiation pattern light distribution region
17 irradiation pattern light distribution region
18 bright part
41 left-side pattern irradiation lamp
42 right-side pattern irradiation lamp

What is claimed is:

1. A vehicle headlight device comprising:
a high beam lamp;
a low beam lamp;
a left-side photoirradiator which irradiates light on a left-side light distribution region on a left side of a travel roadway of a vehicle in an irradiation pattern in which a bright region and a dark region are alternately repeated; and
a right-side photoirradiator which irradiates light on a right-side light distribution region on a right side of a travel roadway of the vehicle in an irradiation pattern in which a bright region and a dark region are alternately repeated,
wherein the left-side photoirradiator and the right-side photoirradiator together form the vehicle headlight device together with the high beam lamp and the low beam lamp of the vehicle.

2. The vehicle headlight device according to claim 1, wherein the left-side photoirradiator is illuminated during left turn of the vehicle, and the right-side photoirradiator is illuminated during right turn of the vehicle.

3. A vehicle headlight device comprising:
a left-side photoirradiator which irradiates light on a left-side light distribution region on a left side of a travel roadway of a vehicle in an irradiation pattern in which a bright region and a dark region are alternately repeated; and
a right-side photoirradiator which irradiates light on a right-side light distribution region on a right side of a travel roadway of the vehicle in an irradiation pattern in which a bright region and a dark region are alternately repeated,
wherein each of the irradiation pattern of the light irradiated by the left-side photoirradiator and the irradiation pattern of the light irradiated by the right-side photoirradiator is a rhombic lattice pattern comprising a plurality of first stripes of light intersected by a plurality of second stripes of light.

4. The vehicle headlight device according to claim 3, wherein a pair of shading masks are applied to the left-side photoirradiator and the right-side photoirradiator, respectively, and each of the shading masks is provided in a grid pattern of clear first lines intersected by clear second lines, and dark rectangular regions outwardly and between the clear first and second lines, each of the irradiation pattern of the light irradiated by the left-side photoirradiator and the irradiation pattern of the light irradiated by the right-side photoirradiator being formed in the rhombic lattice pattern by the shading masks.

* * * * *